(12) United States Patent
Wong

(10) Patent No.: US 11,803,565 B2
(45) Date of Patent: Oct. 31, 2023

(54) SYSTEM AND METHOD FOR VERIFYING SOFTWARE DATA LINEAGE

(71) Applicant: ROYAL BANK OF CANADA, Toronto (CA)

(72) Inventor: Janette Siu Jong Wong, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 257 days.

(21) Appl. No.: 16/685,815

(22) Filed: Nov. 15, 2019

(65) Prior Publication Data
US 2020/0159740 A1 May 21, 2020

Related U.S. Application Data

(60) Provisional application No. 62/767,721, filed on Nov. 15, 2018.

(51) Int. Cl.
| | |
|---|---|
| *G06F 16/00* | (2019.01) |
| *G06F 16/25* | (2019.01) |
| *G06N 5/04* | (2023.01) |
| *G06F 40/30* | (2020.01) |
| *G06Q 40/03* | (2023.01) |

(52) U.S. Cl.
CPC .......... *G06F 16/254* (2019.01); *G06F 16/258* (2019.01); *G06F 40/30* (2020.01); *G06N 5/04* (2013.01); *G06Q 40/03* (2023.01)

(58) Field of Classification Search
CPC .............................. G06F 16/254; G06F 16/258
USPC ...................................................... 707/602
See application file for complete search history.

(56) References Cited

U.S. PATENT DOCUMENTS

| | | | |
|---|---|---|---|
| 10,362,133 B1* | 7/2019 | Maag | H04L 51/216 707/707 |
| 2011/0047056 A1* | 2/2011 | Overman | G06Q 40/06 705/35 |
| 2012/0054146 A1* | 3/2012 | Gupta | G06F 16/2471 707/602 |
| 2015/0012478 A1* | 1/2015 | Mohammad | G06F 16/254 707/602 |
| 2016/0232230 A1* | 8/2016 | Radivojevic | G06F 16/26 707/707 |
| 2017/0154087 A1* | 6/2017 | McClure | G06Q 10/0633 707/707 |

(Continued)

OTHER PUBLICATIONS

Knutilla, Amy et al., Process Specification Language: An Analysis of Existing Representations, May 1998, https://www.nist.gov/publications/process-specification-language-analysis-existing-representations.

*Primary Examiner* — Alexandria Y Bromell
(74) *Attorney, Agent, or Firm* — Norton Rose Fulbright Canada LLP

(57) ABSTRACT

A computer system and method for verifying a data lineage of a data element is provided. The system comprises at least processor and a memory storing instructions which when executed by the processor cause the processor to perform the method. The method comprises extracting data transformation code from programming logic, extracting and describing data transformation semantics from the code using a data transformation ontology, filtering out non-business-significant transformations, and determining that remaining business-significant transformations match a business ontology.

15 Claims, 12 Drawing Sheets

(56) References Cited

U.S. PATENT DOCUMENTS

| | | | |
|---|---|---|---|
| 2017/0199875 A1* | 7/2017 | Nevrekar | G06F 40/186 707/707 |
| 2017/0213127 A1* | 7/2017 | Duncan | G16B 40/00 707/707 |
| 2017/0235848 A1* | 8/2017 | Van Dusen | G06F 30/20 705/12 |
| 2017/0270310 A1* | 9/2017 | Becker | G06F 16/254 707/707 |
| 2019/0279281 A1* | 9/2019 | Kumar | G06Q 30/0631 707/707 |

* cited by examiner

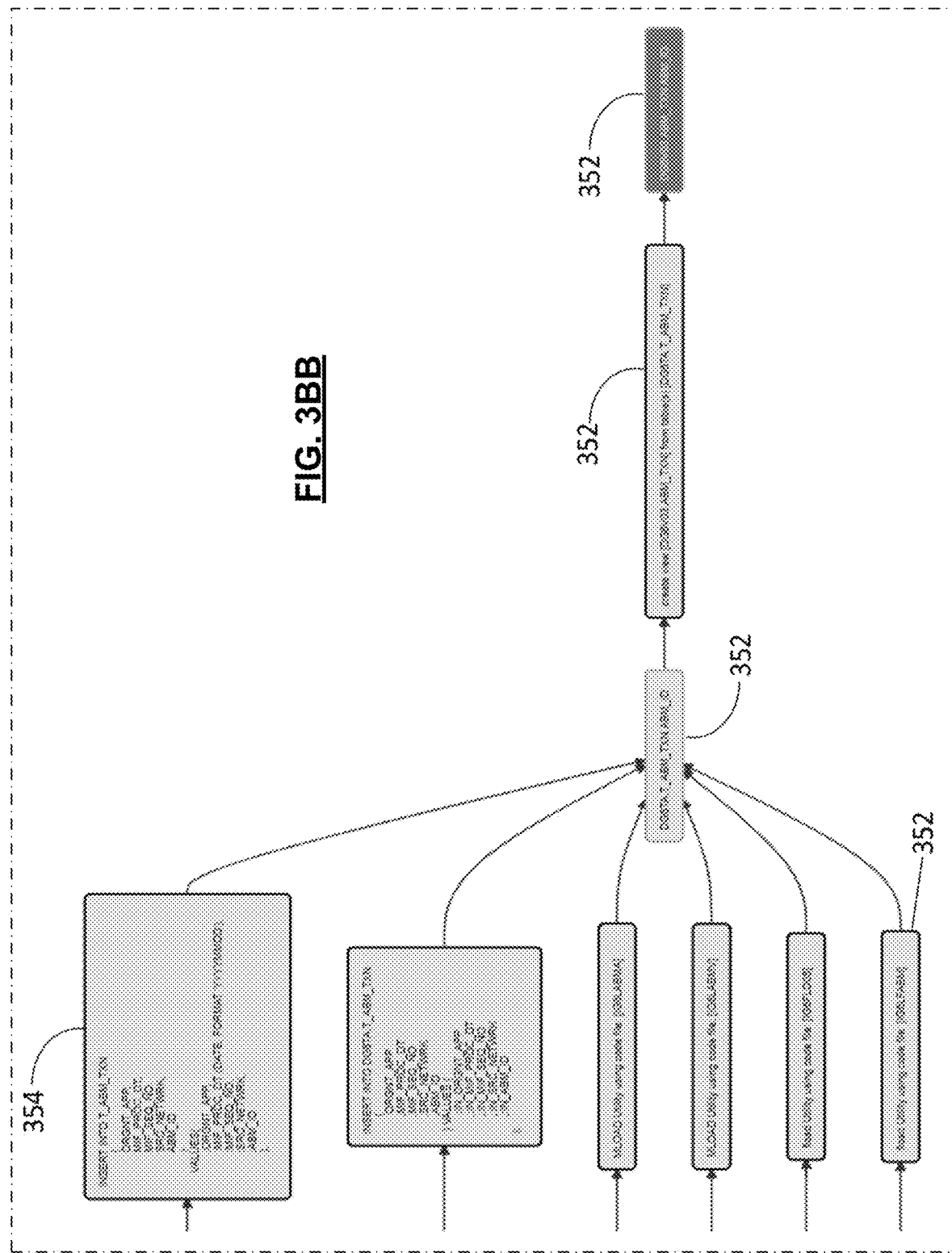

SYSTEM AND METHOD FOR VERIFYING SOFTWARE DATA LINEAGE

FIELD

The present disclosure relates to a system and method for verifying software data lineage.

INTRODUCTION

Data warehousing environments have been developed for many years comprising a mixture of technologies that may use different data structures. In a typical large organization, such as a financial institution, the data warehousing environment is a critical piece of infrastructure which enables reporting and back-end office analysis and processing, such as risk modeling and management, and customer relationship management. To enable such analysis and processing, data is transformed within the data warehousing environment. The number and complexities of the transformations involved depend on the business requirements and the underlying technologies and data structures.

Since the financial crisis of the late 2000s, and privacy focus triggered by the "Big Data" phenomenon, regulators are demanding more transparency into data lineage within the data warehousing environment (i.e., where data come from and what transformations have taken place). Large organizations are incentivized to know their data lineage in order to comply with the regulations and to improve their own operational efficiencies (for example, in doing impact analysis). Examples of regulations include Basel Committee on Banking Supervision's BCBS 239 and the European Union's General Data Protection Regulation (GDPR).

SUMMARY

In one embodiment, there is provided a computer system for verifying a data lineage of a data element. The system comprises at least one processor and a memory storing instructions which when executed by the processor cause the processor to extract data transformation code from programming logic, extract and describe data transformation semantics from the code using a data transformation ontology, filter out non-business-significant transformations, and determine that remaining business-significant transformations match a business ontology.

In another embodiment, there is provided a computer implemented method for verifying a data lineage of a data element. The method comprises extracting (by a processor) data transformation code from programming logic, extracting and describing (by a processor) data transformation semantics from the code using a data transformation ontology, filtering (by a processor) out non-business-significant transformations, and determining (by a processor) that remaining business-significant transformations match a business ontology.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures.

It is understood that throughout the description and figures, like features are identified by like reference numerals.

DETAILED DESCRIPTION

Embodiments of methods, systems, and apparatus are described through reference to the drawings. Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

When processing data in a data warehouse environment, it is often desired to have certainty as to the data lineage (i.e., know where data originates). This is particularly so for critical data elements.

For example, Provision for Credit Loss (PCL) is a useful data element. A financial institution provides loans to clients, but if the clients cannot pay back the loan (i.e., default), the financial institution has to absorb the loss. To anticipate and mitigate such loss, the financial institution sets aside a certain amount of money to cover the potential loss, treating what is being set aside as an expense. The amount that is being set aside is called the PCL. The financial institution may wish to minimize its PCL which is calculated by analyzing loans data from the data warehouse. Financial regulators want to ensure PCL is calculated accurately and require the financial institution to prove or show the lineage of the data used to calculate PCL.

Another example of a useful data element from the data warehouse is Active Client Indicator. This data element indicates if a client is "active" or is engaging with a financial institution. Such knowledge is useful for the purpose of customer relationship management.

Due to the heterogeneity of information technology, it may be difficult to trace data lineage, particularly across different systems or data warehouses. The mixture of technologies in legacy data warehouses and analytics processing may use data transformations (i.e., unit conversions, formatting, etc.) that have no business effect on the data itself.

In some embodiments, a combination of parsing, abstraction into pseudo-code, and ontology may be used to prove (to a level of certainty) that the data lineage (i.e., semantic data transformation behavior of a software module) conforms to semantic data transformation requirements.

Figure 1:
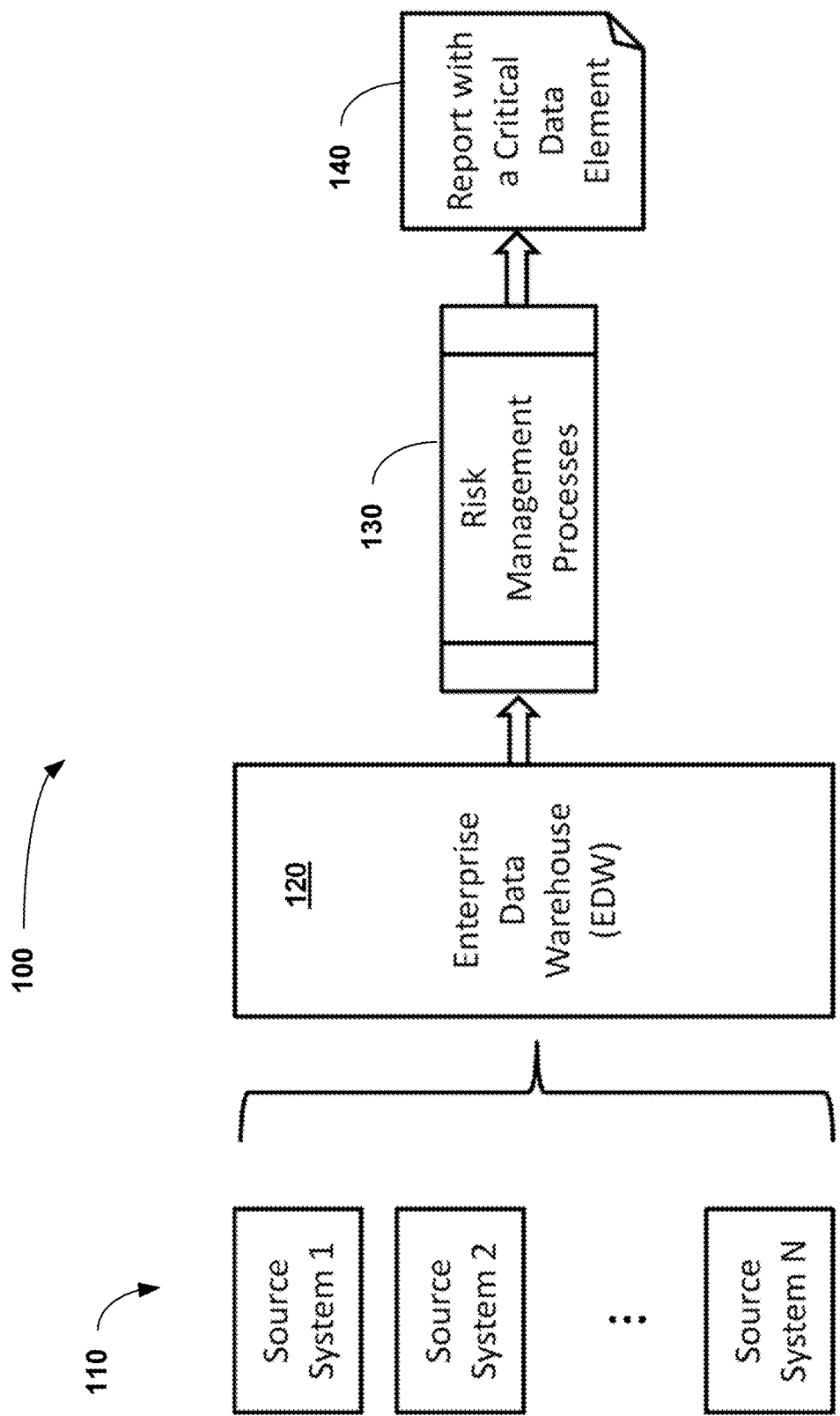
FIG. 1 illustrates, in a component diagram, an example of a high level data flow in an enterprise data system, in accordance with some embodiments.

FIG. 1 illustrates, in a component diagram, an example of a high level data flow in an enterprise data system 100, in accordance with some embodiments. The system 100 comprises at least one source system 110, an enterprise data warehouse (EDW) 120 or other enterprise data storage system, a risk management process 130 and a report 140 with a critical data element. The risk management process 130 may be a business process outside of an information technology (IT) department of the enterprise. Risk management (e.g., credit risk, market risk, liquidity risk, operational risk, etc.) professionals in a financial institution work within that "risk management process," i.e., they take data elements from the data warehouse 120 and combine the data with data/information from other sources 110 and use their own subject matter expertise to manage risks for the financial institution, such as to calculate PCL. Another example is a "customer relationship management (CRM) process" taking data (such as, the Active Client Indicator) from the data warehouse and use it for CRM purposes.

A common high level pattern of data from many "source systems" 110 may flow into the EDW 120 on a regular (daily, weekly, monthly) basis, then used by Enterprise Risk Management or Customer Relationship Management (e.g., Risk Management Process 130 or a CRM Process) to perform risk analysis or customer relationship management analysis and create reports 140 with Critical Data Elements or act on the analysis results to offer products to active clients. The main IT challenge is the heterogeneity of the IT landscape (i.e., the different types of technologies involved, the sheer number of systems, of databases, columns, etc.).

Figure 2:
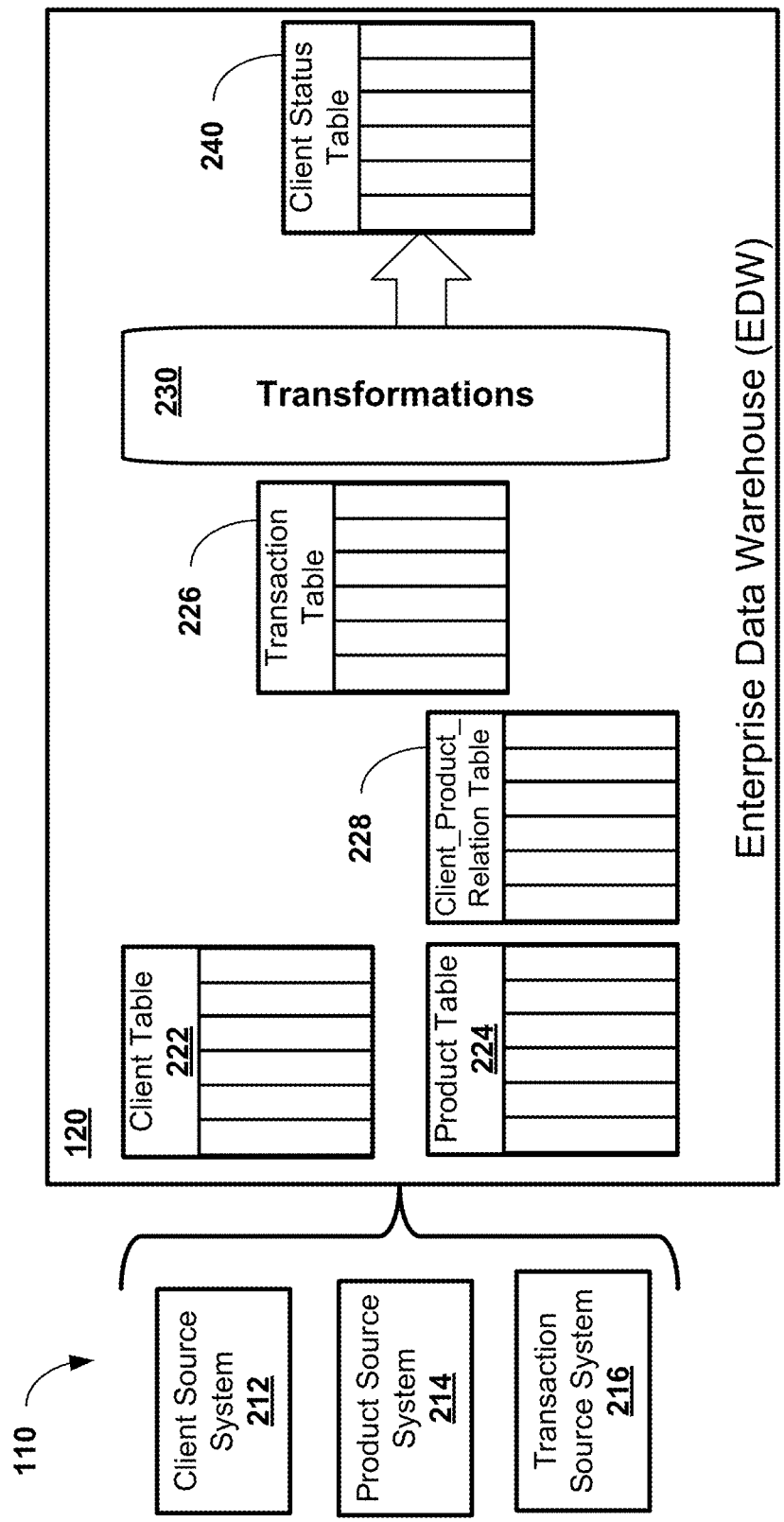
FIG. 2 illustrates, in a component diagram, another example of a high level data flow, mainly within the enterprise data warehouse, in accordance with some embodiments.

FIG. 2 illustrates, in a component diagram, another example of a high level data flow 200, mainly within the enterprise data warehouse, in accordance with some embodiments. The figure shows three source systems 110 (client source system 212, product source system 214, transaction source system 216) providing data to populate database tables within the data warehouse 120.

Client source system 212 data is used to populate the client table 222 with client identifying information. The client table 222 includes various columns describing clients, including their client_id (e.g., in financial institution embodiments, the client card number), name, address, demographics, etc. In the examples provided herein, the client_id is an input data element into the data warehouse.

Product source system 214 data is used to populate the product table 224 and the client_product_relation table 228 with product identifying information. In the examples provided herein, the product table includes various columns describing, for example, financial products, including account types (e.g., chequing accounts, savings accounts, credit card accounts, etc.), the name of the product, service charges, characteristics of product, interest rates, etc. It is understood that the present disclosure can apply to other products in other industries where product information is stored in a data warehouse. There may be multiple tables per product (or all products may be in one or more tables). The product table 224 also includes information on which client have purchased products. The client_product_relation table 228 stores relations between clients and products. This table 228 includes product identifiers for all products owned by a client. For example, if there are 100 products, each product may have an identifier (id) P1, P2, etc. If client C1 owns products P1, then C1 is related to P1. If client C1 also owns product P2, then C1 is also related to P2. I.e., the table 228 may store parings of client-product identifiers to signify which client owns which product. In the examples provided herein, the client_id and product_id are input data elements to the data warehouse.

Transaction source system 216 data is used to populate the transaction table 226 with transaction data identifying information. The transaction table 226 includes various columns describing transactions performed by clients using certain products. The table 226 includes transaction data for all transactions performed on a product by a client. For example, if the product is a chequing account, the table 226 may include automated teller machine (ATM) withdrawals, transfers, deposits, other banking transactions, etc. There may be many different transaction tables 226, for example, at least one per product. In the examples provided herein, the active_client_indicator is an output data element from the data warehouse. Table 1 illustrates an example of an extracted snippet of implementation logic which derives active_client_indicator, stored in client status table 240:

TABLE 1

Example Client-Status Table 240

| Source Data Elements | Transformation | Target Data Element |
|---|---|---|
| client_id, {client_id, product_id} {client_id, product_id, transaction_id, transaction_date} | Implementation logic (e.g., written in a combination of COBOL or Java and Structured Query Language (SQL)) to derive/calculate the value of the target/output data element active_client_indicator based on the values of the source/input data elements | active_client_indicator |

As noted above, the present disclosure may apply to non-financial services industries. For example, if the products are appliances, then appliance types, model numbers and client details may be collected in a data warehouse.

Transformations 230 take data from the input tables 222, 224, 226, 228 and analyze and derive insights therefrom. The insights may be stored in a client_status table 240. The client_status table 240 may include a number of columns describing the clients. In the examples described herein, an insight comprises whether or not a client account is active. The following pseudo-code illustrates an example of transformation logic:

```
SET today_date = system_date( )
CONVERT_DATE_FORMAT(today_date, format1, format2)
FOR each client in Client Table
   SELECT product_id from Client_Product_Relation Table WHERE
   client_id = x
   IF not NULL
      // If some records are returned, it means client 'x' owns some
      products
      FOR each product z
         SELECT transaction_id from Transaction Table WHERE
         (client_id = x) AND (product_id = z) AND (today_date -
         transaction_date <= 30)
         IF not NULL
            // If some records are returned, it means client 'x'
            // has performed some activity on product 'z' in the last 30
            days
            UPDATE Client_Status Table SET (client_id=x,
            active_client_indicator = true)
            BREAK // Break out of the "For each product z" loop
         endIF
      endFOR
      // Client has not performed any activity for any of the product he or
      she owns
      UPDATE Client_Status Table SET (client_id=x, active_client_
      indicator = false)
   Else
      // Client does not own any product
      UPDATE Client_Status Table SET (client_id=x, active_client_
      indicator = false)
   endIF
endFOR
```

The teachings of the present disclosure show how to leverage ontology to show that Transformations 230 is performing what actions are intended with respect to the data elements. Data from the client status table 240 may be used as to generate reports 140 or used in lieu of reports 140.

Table 2 illustrates an example of the volume of database tables, views, columns, etc., in accordance with some embodiments. The values provided represent a subset of what a financial institution would typically have in its data warehouse. As such, a computer implementation is required to effectively and feasibly process the data lineage of all the data elements (including the critical data elements) of the data of a financial institution.

TABLE 2

| Volume of database components | | |
|---|---|---|
| Language | Component | # of instances |
| Database Component | | |
| | Database Table | 50009 |
| | Database View | 30496 |
| | Database Column | 557844 |
| | | 792102 |
| | Options | 15 |
| | Primary Key | 221 |

TABLE 2-continued

| Volume of database components | | |
|---|---|---|
| Language | Component | # of instances |
| | Primary Index | 47018 |
| | Index Column | 575 |
| | Partition Rule | 283 |
| | Definition | 11457 |
| | Database | 350 |
| | Total | 1,490,370 |

It should be noted that tracing lineage for all the data elements in the data warehouse provides benefits beyond regulatory compliance. For example, internal impact analysis is another reason why one may want to trace from where data comes from (and where data go to). If something changes upstream, and if it is known that what is being changed is used downstream, it is advantageous in managing the change.

Figure 3A:
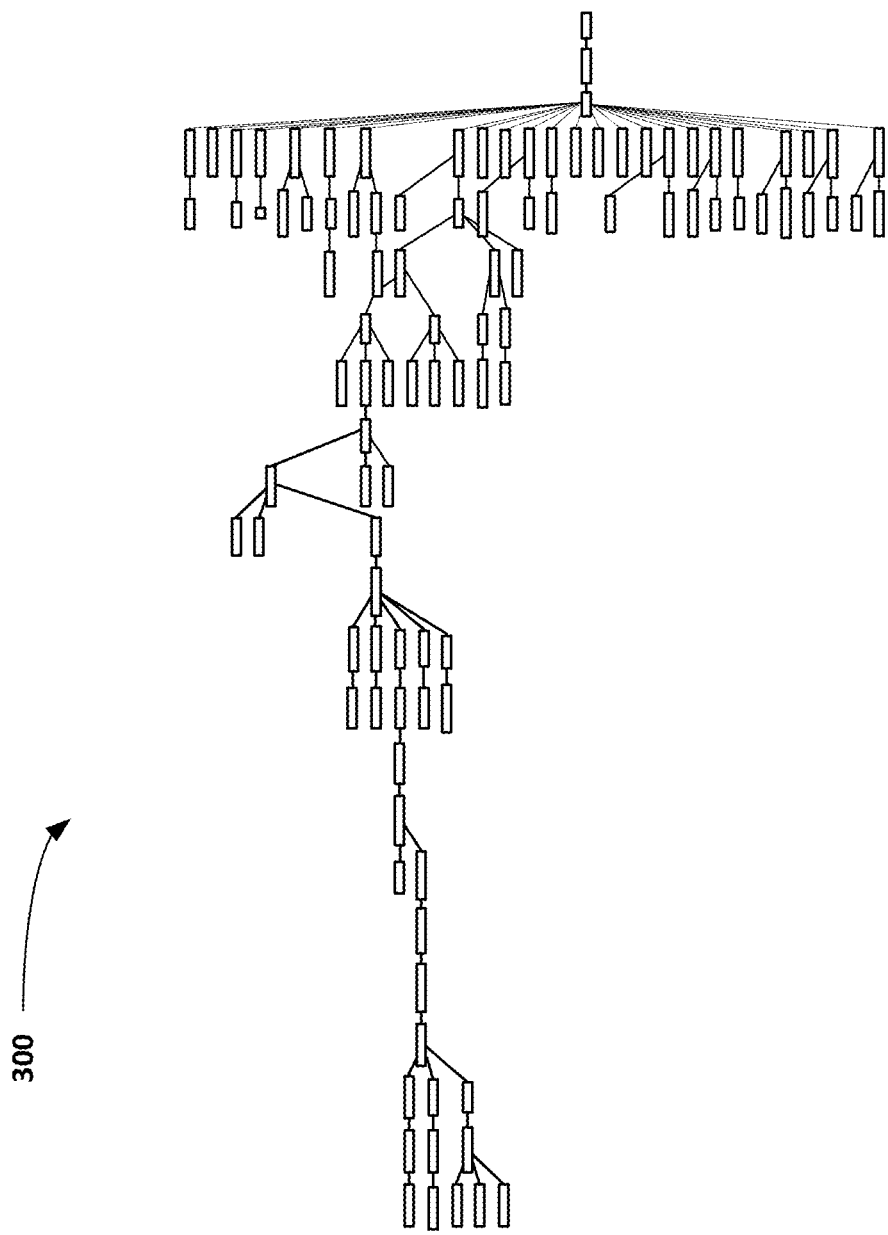
FIG. 3A illustrates, in a tree diagram, an example of a data lineage tree, in accordance with some embodiments.

FIG. 3A illustrates, in a tree diagram, an example of a data lineage tree 300, in accordance with some embodiments. It should be noted that several nodes may be expanded, but have not been for ease of presentation. FIG. 3A shows data from different parts (including inputs) of the data warehouse being transformed and converged to derive the output data elements. Some of the transformations have no business-significance, and exist for IT reasons only. Business-significance may be defined as changing the business semantics of the target data element.

Figure 3B:
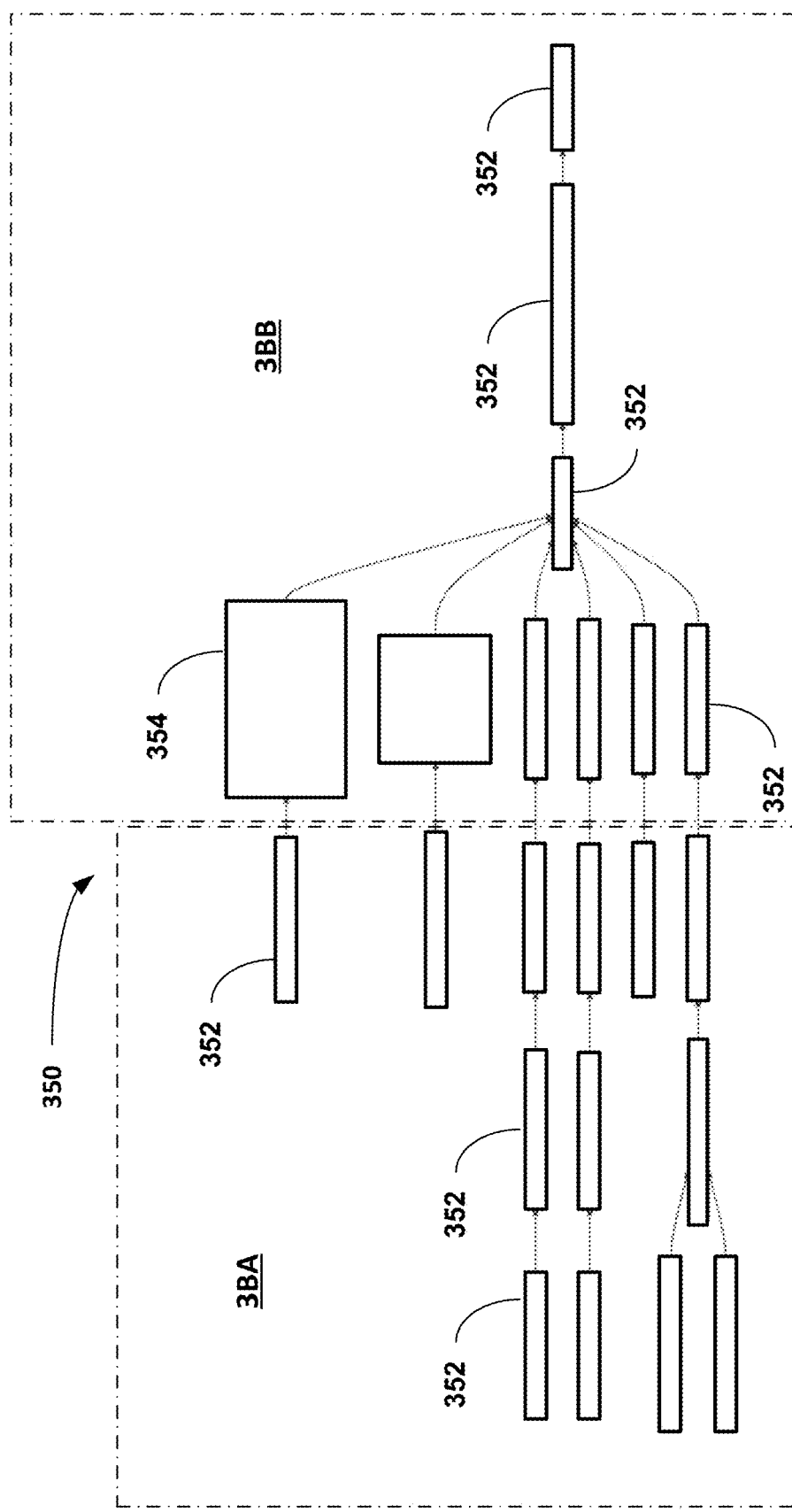
FIGS. 3B, 3BA, and 3BB illustrate, in a tree diagrams, another example of a data lineage tree, in accordance with some embodiments.
Figure 3B:
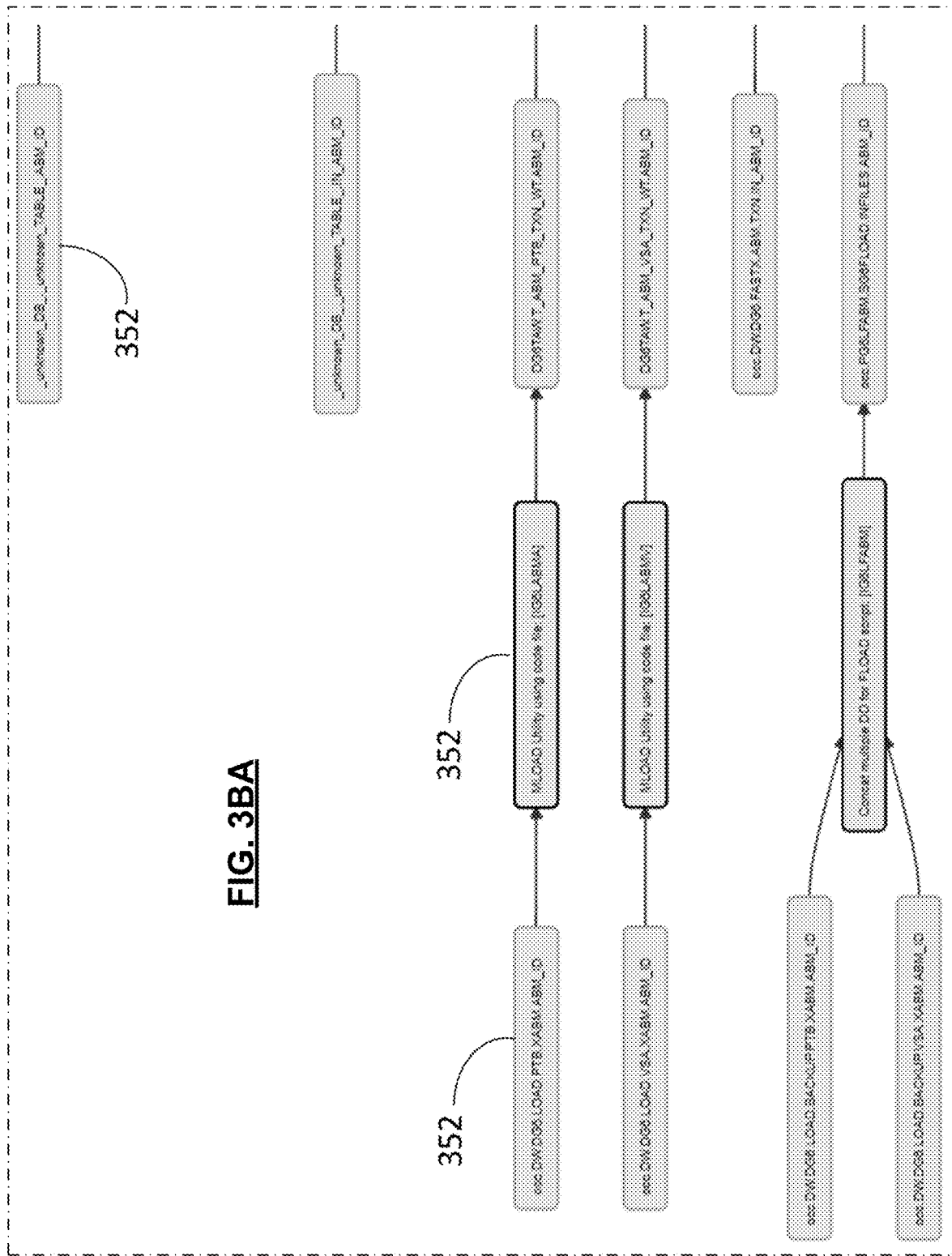

FIGS. 3B, 3BA and 3BB illustrate, in tree diagrams, another example of a data lineage tree 350, in accordance with some embodiments. The tree 350 illustrates an example of a data lineage. The tree 350 illustrates several nodes 352 represented as variable names of, and/or pointers to data elements 352. Two nodes of data logic 354 are also shown in this example representing snippets of code. Arrows represent that the data element to the left is inputted into the node to the right. Tree 350 illustrates the data lineage of data elements 352 to the right end of the tree via transformations from data elements 352, 354 to their left. The disclosure herein demonstrates how ontology may be used to test all transformations up to a certain data element or point on the data lineage tree. FIGS. 3BA and 3BB are enlarged views of portions of FIG. 3B.

Figure 4:
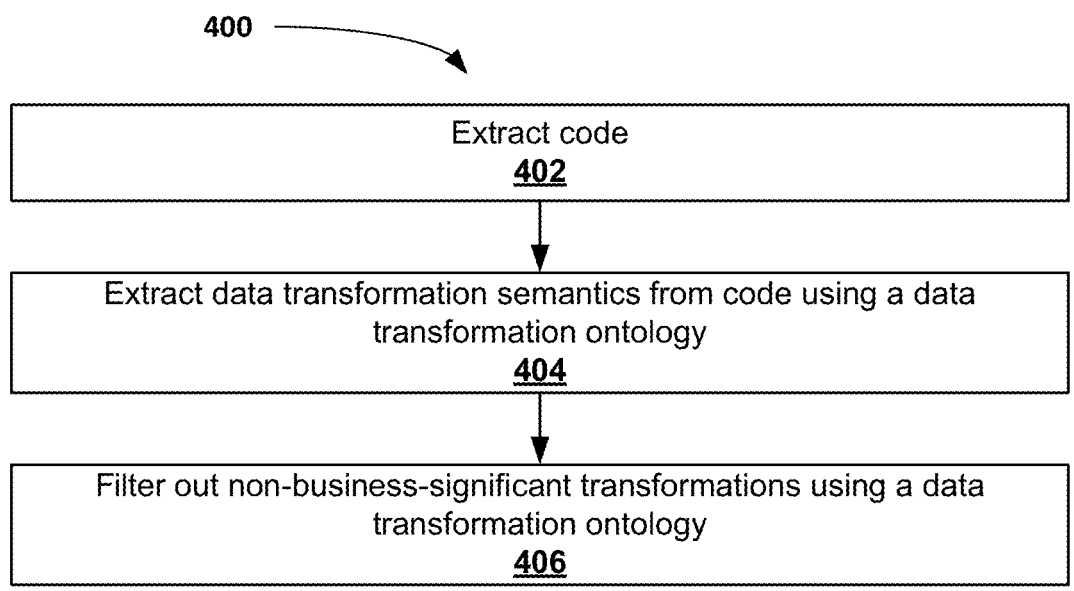
FIG. 4 illustrates, in a flowchart, an example of a method of filtering out non-business-significant transformations, in accordance with some embodiments.

FIG. 4 illustrates, in a flowchart, an example of a method 400 of filtering out non-business-significant transformations, in accordance with some embodiments. The method 400 comprises extracting 402 code from programming logic, extracting 404 data transformation semantics from the code using a data transformation ontology, determining 406 that code remaining after the data transformation semantics extraction matches a business ontology. In some embodiments, the extracting step 404 extracts and describes both business significant and non-business significant data transformation semantics from the code using a data transformation ontology, uses a reasoning capability of the data transformation ontology to filter out the non-business significant transformations, and determines that the remaining business-significant transformations match a business ontology. Other steps may be added to the method 400.

It is noted that the term "reasoning capability" means using an inference engine to perform reasoning. An inference engine is a program that performs inferences according to some inference rules. An ontology includes inference rules. Therefore, when a data transformation ontology is generated, such inference rules will be created. These inference rules will be able to "reason" (i.e., infer) the semantics of the data transformation actions. For example, the engine may be configured to infer that copying the data without dropping any significant digits, or reducing decimal places, does not change the meaning/semantics of the data element, and hence, such copying is non-business-significant. Another example of a non-business-signification transformation is the formatting of data. The value and meaning of the data remain the same; only the format has changed. If during the processing of the data, a data element is copied several times and renamed several times, or reformatted, the "reasoner" or inference engine will reason that these actions have no business-significance and therefore can be filtered out.

Figure 5A:
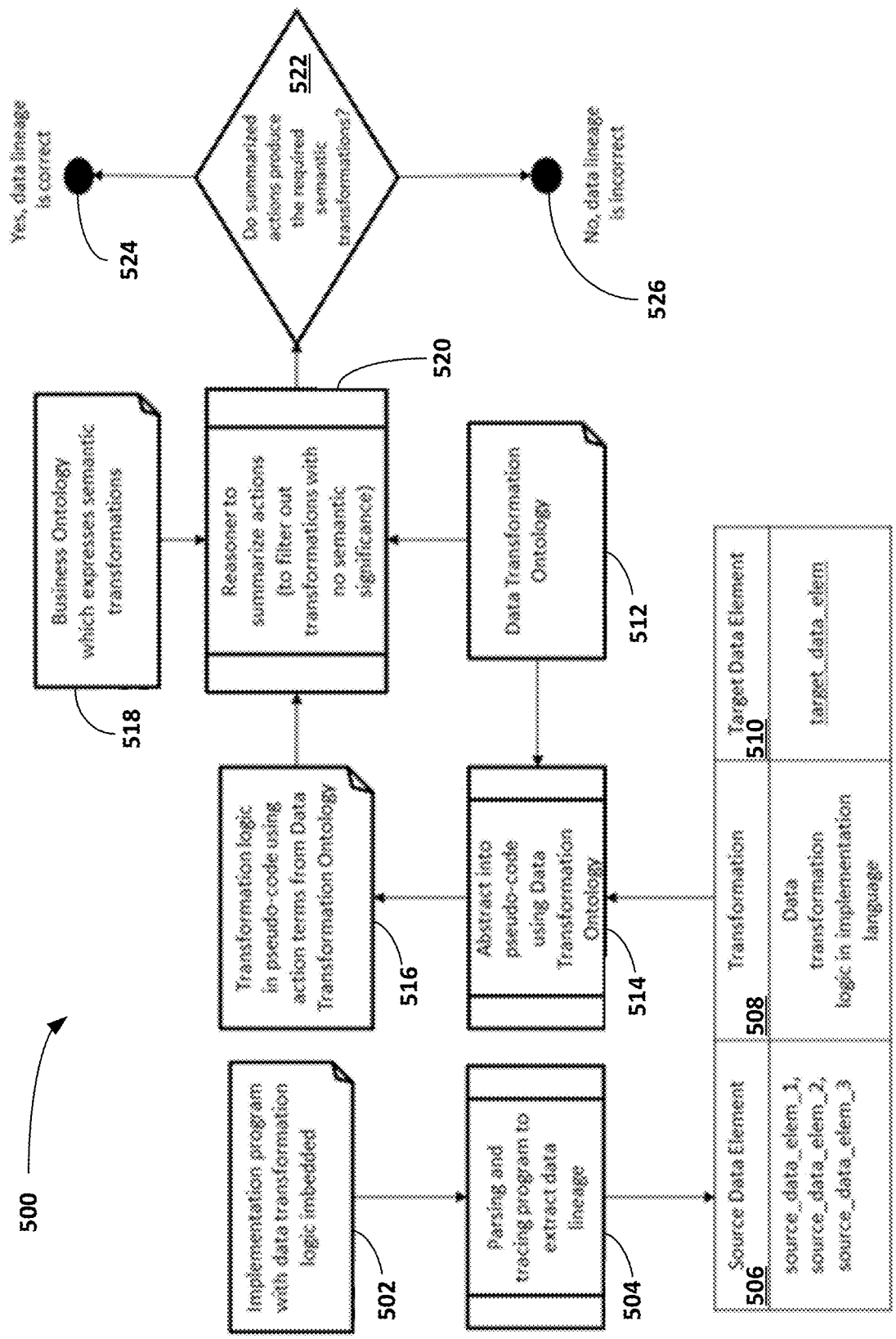
FIG. 5A illustrates, in a flowchart, an example of a method of verifying a data lineage, in accordance with some embodiments.

FIG. 5A illustrates, in a flowchart, another example of a method 500 of verifying a data lineage, in accordance with some embodiments. A program 502 written in a certain programming language may contains logic which performs data transformations. A parser 504 may be used to analyze and trace the programming logic in order to extract data lineage, which can be defined as where data come from and what happened to that data along the way. In this context, the parser traces the data lineage within the program. Given a Target Data Element 510, the parser 504 may extract a snippet of code which outputs the Target Data Element 510, and the Source (i.e., Input) Data Element(s) 506 used by the code (See Table 1). For example, in a simple case, the logic may comprise a function, the Target Data Element 510 may be the output parameter of the function, and the Source Data Elements 506 may be the input parameters to the function.

A Data Transformation Ontology 512 may be created (for example, using an ontology development environment tool) to formalize the semantics of generic data transformation operations. The data transformation logic in implementation language 508 and the created DTO may input/received by an abstraction unit to abstract 514 the data transformation logic into pseudo-code 516. Some analogous concepts for this ontology may already exist in other physical domains, and the ontology may be designed via the technique of ontology transfer. Using the Data Transformation Ontology 512 and metamodels (for example, such as the Abstract Syntax Tree and Knowledge Discovery from the Object Management Group), the transformation logic extracted in 514 can be translated into pseudo-code 516 with action terms prescribed by the Data Transformation Ontology 512.

A Business Ontology 518 may be created (again using an ontology tool) which formalizes the semantics of the concepts in the input and output interfaces of the program in 502. The ontology 518 will express the concepts, their relationships, and how one concept is derived from the other, but not how the concepts, relationships, and derivations need to be implemented. The Business ontology 518, DTO 512 and pseudo-code 516 may be input into a reasoner 520 to summarize actions (e.g., to filter out transformations with no semantic significance).

Figure 5B:
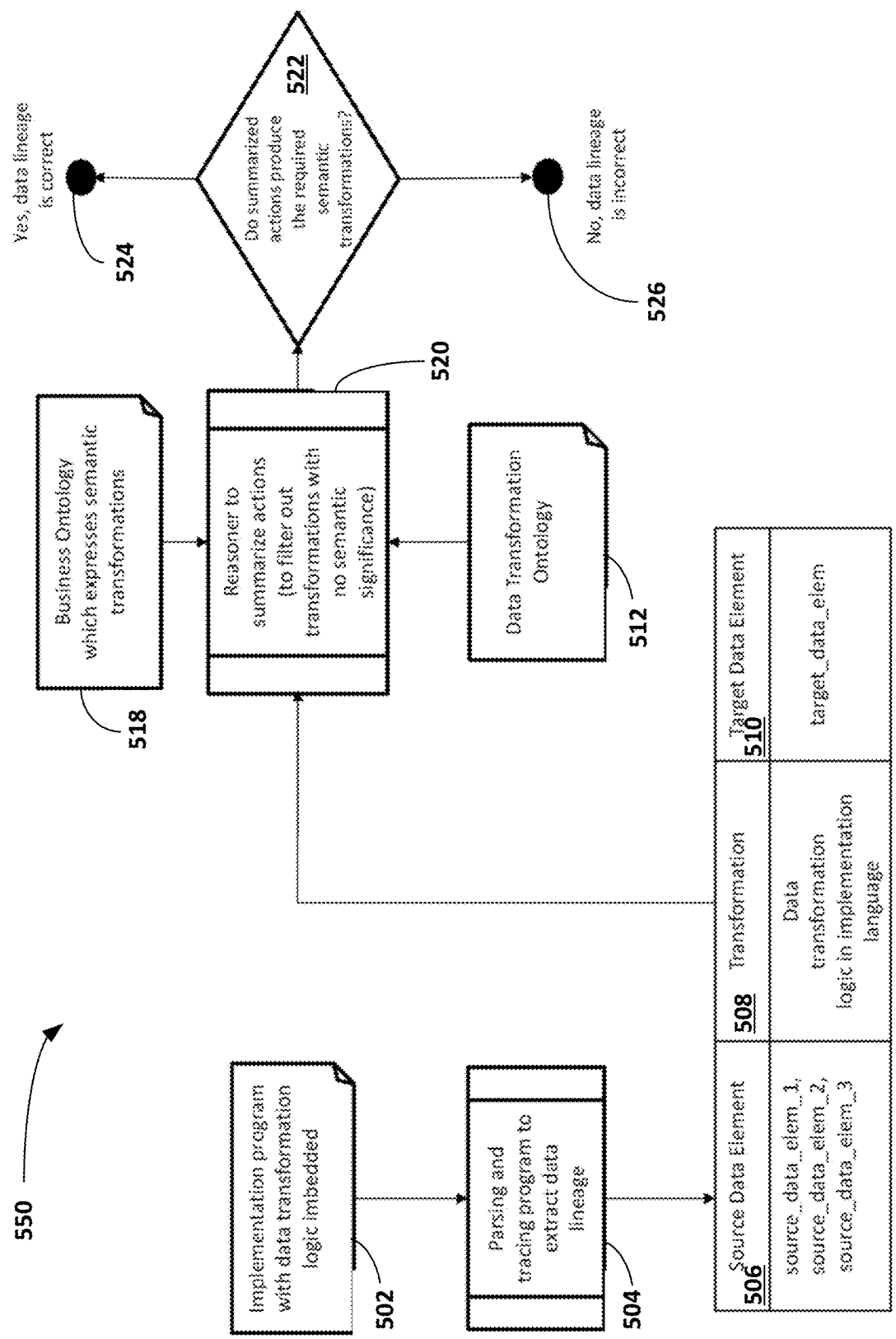
FIG. 5B illustrates, in a flowchart, another example of a method of verifying a data lineage, in accordance with some embodiments.

FIG. 5B illustrates, in a flowchart, another example of a method 550 of verifying a data lineage, in accordance with some embodiments. A program 502 written in a certain programming language may contains logic which performs data transformations. A parser 504 may be used to analyze and trace the programming logic in order to extract data lineage, which can be defined as where data come from and what happened to that data along the way. In this context, the parser traces the data lineage within the program. Given a Target Data Element 510, the parser 504 may extract a snippet of code which outputs the Target Data Element 510, and the Source (i.e., Input) Data Element(s) 506 used by the code. For example, in a simple case, the logic may comprise a function, the Target Data Element 510 may be the output parameter of the function, and the Source Data Elements 506 may be the input parameters to the function. This method 550 will be described using an example where the target data element is the active_client_indicator.

A Data Transformation Ontology 512 may be created (for example, using an ontology development environment tool) to formalize the semantics of generic data transformation operations. Some analogous concepts for this ontology may already exist in other physical domains, and the ontology may be designed via the technique of ontology transfer. Some analogous concepts for this ontology may be reused from, for example, the Process Specification Language (PSL) Ontology, which is ISO standard 18629). Using the Data Transformation Ontology 512 and additional rules specific to the implementation programming language being analyzed, the semantic-significance of the data transformations 508 can be determined.

The Business Ontology 518 may be created (again using an ontology tool) which formalizes the semantics of the concepts in the input and output interfaces of the program in 502. The ontology 518 will express the concepts, their relationships, and how one concept is derived from the other, but not how the concepts, relationships, and derivations need to be implemented. The Business ontology 518, DTO 512 and data transformation 508 may be input into a reasoner 520 to summarize actions (e.g., to filter out transformations with no semantic significance).

Thus, FIG. 5B illustrates a method whereby software implementation logic is abstracted into pseudo code (constrained by the terms in the DTO), reasoning/inferencing power of ontologies (expressed as part of the DTO) are then used to filter out semantically insignificant transformation, and the semantics of the "botton-up" outputs from step 504 and the semantics of the top-down business/financial ontology are matched to prove correctness of the software behaviour.

Figure 6:
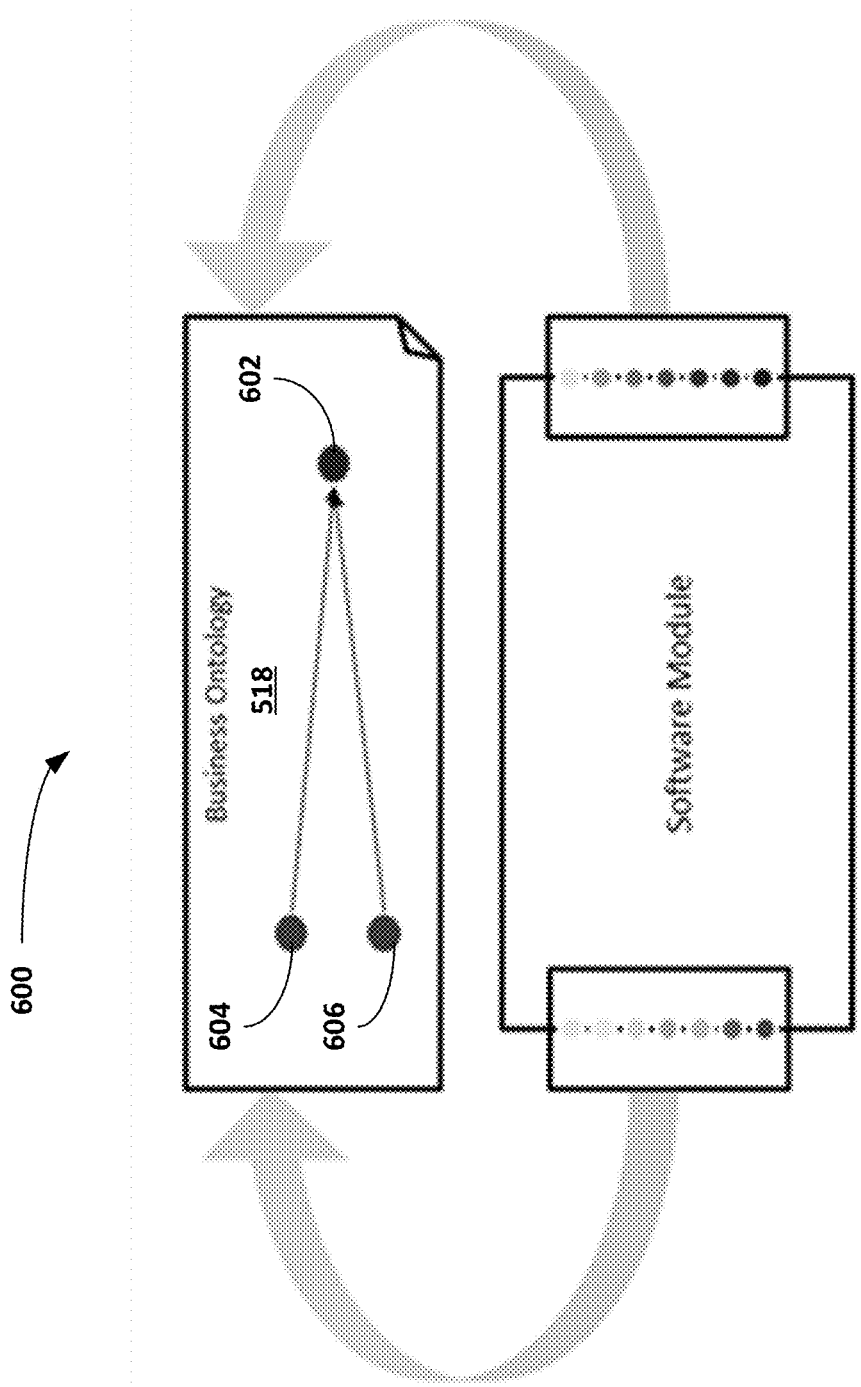
FIG. 6 illustrates, in a component diagram, an example of a business ontology representation, in accordance with some embodiments.

FIG. 6 illustrates, in a component diagram, an example of a business ontology representation 600, in accordance with some embodiments. Within the example business ontology 518, point 602 represents a Profitability Code of a Client, point 604 represents a Segmentation Code, and point 606 represents the Total Assets of a Client. The Business Ontology 518 expresses the semantics and relationships of these concepts. Since Profitability Code 602 is derived from Segmentation Code 604 and Total Assets 606, some data transformations take place. The Business Ontology 518 describes at the semantic level what transformations should occur without prescribing how the transformations should be implemented in any particular programming language. Another example of a Business Ontology is illustrated by showing how the output data element (Active Client Indicator) can be derived from input data elements describing client, products, and transactions information.

Referring back to FIG. 5A, a Reasoner unit 520 (e.g., an inference engine comprising instructions executed by one or more processors) may be developed based on the Data Transformation Ontology 512 to infer from the translated pseudo code 514 whether the program behaves as intended (i.e., according to the semantics of the Business Ontology 518), by filtering out data transformations 520 which do not have business-significance. The inference engine may be implemented using logic programming in addition to doing deductions, and may include rules that are specific to the implementation programming language being analyzed.

In some embodiments, a method of verifying a data transformation combines the abstraction of software implementation into pseudo code (constrained by the terms in the Data Transformation Ontology (DTO) 512), using the reasoning/inferencing power of ontologies (expressed as part of the DTO 512) together with rules to filter out semantically insignificant transformations, and matching the semantics of the "bottom-up" outputs and the semantics of the top-down Business Ontology 518 to prove correctness of a program. I.e., if the summarized actions produce the semantic transformations 522, then a determination 524 that the data lineage is correct may be made. Otherwise 522, a determination 526 that the data lineage is incorrect may be made.

Referring back to FIG. 5B, a Reasoner unit 520 (e.g., an inference engine comprising instructions executed by one or more processors) may be developed based on the Data Transformation Ontology 512 and Business Ontology 518. The inference engine may be implemented using logic programming in addition to doing deductions, and may include rules that are specific to the implementation programming language being analyzed.

In some embodiments, a method of verifying a data transformation combines, using the reasoning/inferencing power of ontologies (expressed as part of the DTO 512) together with rules to filter out semantically insignificant transformations, and matching the semantics of the "bottom-up" outputs and the semantics of the top-down Business Ontology 518 to prove correctness of a program. I.e., if the summarized actions produce the semantic transformations 522, then a determination 524 that the data lineage is correct may be made. Otherwise 522, a determination 526 that the data lineage is incorrect may be made.

Figure 5C:
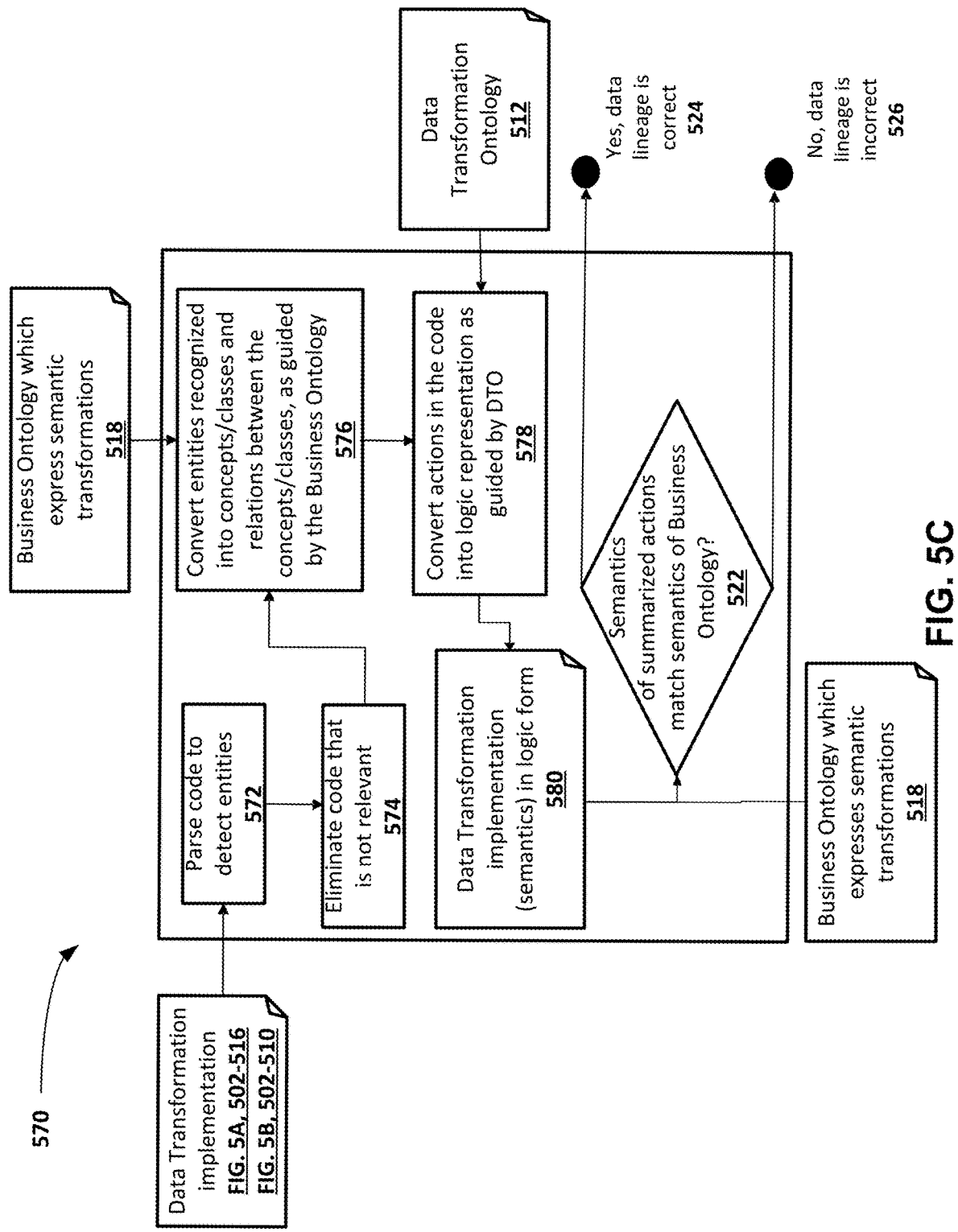
FIG. 5C illustrates, in a flowchart, an example of a method of process of a reasoner, in accordance with some embodiments.

FIG. 5C illustrates, in a flowchart, an example of a process 570 of a reasoner 520 to determine if a data lineage is correct, in accordance with some embodiments. The reasoner 520 receives the data transformation implementation (steps 502 to 516 in FIG. 5A; steps 502 to 510 in FIG. 5B) and parses 572 the code to detect entities (e.g., client, product, etc.). Any code that is not relevant is eliminated 574. Next, the reasoner 520 converts 576 the entities recognized into concepts/classes and relations between the concepts/classes, as guided by the Business Ontology 518 received as input. Next the actions in the code are converted 578 into logic representations as guided by the DTO 512 received as input. This results in a data transformation implementation (semantics) in logic form 580. If the semantics of the summarized actions match 522 the semantics in the business ontology 518, then the data lineage is correct 524. Otherwise 522, the data lineage is incorrect 526.

Ontology

An ontology is a declaration of terminology together with a machine-interpretable specification of the meaning (semantics) of the terms. An ontology is especially useful when there is a need for a shared conceptualization that is characterized by high semantic expressiveness required for increased complexity, and inferencing/reasoning is desired. Ontologies initially arose from the Shareable, Reusable Knowledge Bases Project at the Knowledge Representation Lab of Stanford University. Knowledge Representation and Reasoning (KR) is a sub-field of Artificial Intelligence dedicated to representing information of the world in the form so as to allow a computer to reason automatically with relevant information for solving complex tasks such as decision support. To make the meaning of terms machine-interpretable, ontologies are written or specified using logic, such as First Order Logic (FOL). In logic, a primitive is a concept that is not defined in terms of previously defined concepts. Relations between primitives are restricted by axioms of the ontology.

In the following disclosure, some axioms from the Process Specification Language (PSL) Ontology (which has been published as the International Standard ISO 18629) are reused. In PSL, "fluent" is used to capture the change in state. For example, the prior(f, o) relation specifies that a fluent f is true prior to an activity occurrence o, and the holds(f, o) relation specifies that a fluent f is true after an activity occurrence o. Table 3 shows meanings of the symbols used in in First Order Logic:

TABLE 3

| Symbols used in First Order Logic | |
|---|---|
| Symbol | Meaning |
| $\forall$ | "for all" (also known as Universal Quantifier) |
| $\exists$ | "there exists" (also known as Existential Quantifier) |
| $\wedge$ | "conjunction" (also known as And) |
| $\vee$ | "disjunction" (also known as Or) |
| $\neg$ | "negation" (also known as Not) |
| $\supset$ | "implies" |
| $\equiv$ | "equivalence" |

Table 4 includes core theories in the PSL Ontology:

TABLE 4

| Core Theories in PSL Ontology | | |
|---|---|---|
| $T_{psl\_core}$ | activity(a) | a is an activity |
| | activity_occurrence(o) | o is an activity occurrence |
| | timepoint(t) | t is a timepoint |
| | object(x) | x is an object |
| | occurrence_of(o, a) | o is an occurrence of a |
| | beginof(o) | the beginning timepoint of o |
| | endof(o) | the ending timepoint of o |
| | before($t_1$, $t_2$) | timepoint $t_1$ precedes timepoint $t_2$ on the timeline |
| $T_{subactivity}$ | subactivity($a_1$, $a_2$) | $a_1$ is a subactivity of $a_2$ |
| | primitive(a) | a is a minimal element of the subactivity ordering |
| $T_{atomic}$ | atomic(a) | a is either primitive or a concurrent activity |
| | conc($a_1$, $a_2$) | the activity that is the concurrent composition of $a_1$ and $a_2$ |
| $T_{occtree}$ | legal(s) | s is an element of a legal occurrence tree |
| | earlier($s_1$, $s_2$) | $s_1$ precedes $s_2$ in an occurrence tree |
| $T_{disc\_state}$ | holds(f, s) | the fluent f is true immediately after the activity occurrence s |

TABLE 4-continued

| | | Core Theories in PSL Ontology |
|---|---|---|
| | prior(f, s) | the fluent f is true immediate before the activity occurrence s |
| $T_{complex}$ | min_precedes($s_1$, $s_2$, a) | the atomic subactivity occurrence $s_1$ precedes the atomic subactivity occurrence $s_2$ in an activity tree for a |
| | root(s, a) | the atomic subactivity occurrence s is the root of an activity tree for a |
| | next_subocc($s_1$, $s_2$, a) | the atomic subactivity occurrence $s_1$ is preceded by the atomic subactivity occurrence $s_2$ in an activity tree for a |
| $T_{actocc}$ | subactivity_occurrence($o_1$, $o_2$) | $o_1$ is a subactivity occurrence of $o_2$ |
| | root_occ(o) | the initial atomic subactivity occurrence of o |
| | leaf_occ(s, o) | s is the final atomic subactivity occurrence of o |
| $T_{duration}$ | timeduration(d) | d is a timeduration |
| | duration($t_1$, $t_2$) | the timeduration whose value is the "distance" from timepoint $t_1$ to timepoint $t_2$ |

The complete PSL Ontology can be located at https://www.nist.gov/publications/process-specification-language-analysis-existing-representations.

Business Ontology

Table 5 shows examples of business ontology primitives:

TABLE 5

Example Business Ontology Primitives

| Class/Relation Name | Description |
|---|---|
| client(x, y) | x is a client in organization y |
| person(x) | x is a person |
| organization(y) | y is an organization |
| product(z) | z is a product |
| openProduct(z) | z is an open product |
| activeProduct(z) | z is an active product |
| bankActivity(z) | a bank activity performed on z |
| owns(x, z) | x owns z |
| issues(y, z) | y issues z |
| purchase(x, z) | x purchase z |

Table 6 shows an example of business ontology definition:

TABLE 6

Example Business Ontology Definition

| Class/Relation Name | Description |
|---|---|
| activeClient(x) | x is an active client |

The following are examples of business ontology axioms:
1. Only a person or an organization can play a client role in an organization.
   $\forall(x, y)$ client(x, y) $\supset$ (organization(x) $\lor$ person(x)) $\land$ organization(y)
2. To become a client at an organization, you have to own a product issued by the organization.
   $\forall(x, y)$ client(x, y) $\supset$ $\exists z$ product(z) $\land$ owns(x, z) $\land$ issues(y, z)
3. A client owns a product after the client has purchased it.
   $\forall(x, z, occ)$ holds(owns(x, z), occ) $\supset$ product(z) $\land$ occurrence_of(occ, purchase(x, z))
4. A product is considered "open" after a client has purchased it.
   $\forall(x, z, occ)$ holds(openProduct(z), occ) $\supset$ product(z) $\land$ occurrence_of(occ, purchase(x, z))
5. A product is "active" means it is "open" and also has "bank activity" (e.g. deposit) performed within the last 30 days (from a given date).
   $\forall(z, t, occ)$ holds(activeProduct(z), occ) $\supset$ holds(openProduct(z), occ) $\land$ occurrence_of(occ, bankActivity(z)) $\land$ is_occurring_at(occ, t) $\land$ within_30_days(GIVEN_DATE, t)
6. A client is active when the client owns at least one active product.
   $\forall(x, occ)$ holds(activeClient(x), occ) $\equiv$ $\exists z$ owns(x, z) $\land$ product(z) $\land$ holds(activeProduct(z), occ)

Data Transformation Ontology

Table 7 shows examples of data transformation ontology (DTO) primitives:

TABLE 7

Example DTO Primitives

| Class/Relation Name | Description |
|---|---|
| value(v) | v is a value |
| table(t) | t is a table |
| row(r, t) | r is a row in table t |
| column(c, t) | c is a column of table t |
| valueOfColumn(v, c) | v is the value of column c |
| statement(/) | An activity carried out by the (programming) statement / |
| blockOfStatements(m, n) | An activity carried out by the block of (programming) statements from m to n |

Table 8 shows an example of a DTO definition:

TABLE 8

Example DTO Definition

| Class/Relation Name | Description |
|---|---|
| simpleFilter(t, v) | Table t is filtered based on a simple condition on the value of a column of t |

The following are examples of DTO axioms:
1. Iteration of an activity requires a certain condition to be true
   $\forall(o_1, l)$ occurrence_of($o_1$, statement(l)) $\supset$ ($\forall(o_2, s_1, m, n)$ occurrence_of($o_2$, blockOfStatements(m,n)) $\land$ subactivity_occurrence($o_2$, $o_1$) $\wedge$ leaf_occ($s_1$, $o_2$) $\supset$ (leaf_occ($s_1$, $o_1$) $\vee$ ($\exists$($o_3$, $s_2$, m, n, l) occurrence_of ($o_3$, blockOfStatements(m,n)) $\wedge$ ($s_2$=root_occ($o_3$)) $\wedge$ next_subocc($s_1$, $s_2$, statement(l))))))

2. Occurrence of an activity requires NOT NULL to be true $\forall$(s, $o_1$, l) occurrence_of($o_1$, statement(l)) $\wedge$ (root_occ ($o_1$)=s) $\wedge$ prior($\neg \emptyset$, s) $\supset$ $\exists$($o_2$, m, n) occurrence_of ($o_2$, blockOfStatements(m,n)) $\wedge$ subactivity_occurrence($o_2$, $o_1$) $\wedge$ (root_occ($o_2$)=s)

3. An equals filter on a table means to select those rows in the table with a column whose values equal the value in the filter.

$\forall$(t, v) simpleFilter(t, v) $\equiv$ $\exists$c column(c, t) $\wedge$ valueOfColumn(v, c) $\wedge$ value(va) $\wedge$ ((v=va) $\vee$ (v>va) $\vee$ (v$\geq$va) $\vee$ (v<va) $\vee$ (v$\leq$va) $\vee$ (v$\neq$va))

DTO axioms #1 and #2 above follow the same structure of axioms found in the "Using the PSL Ontology" paper. DTO axiom #1 follows the iteration axiom:

Iteration

Iteration is captured by the class of repetitive activities, in which the activity tree can be decomposed into copies of some subtree (which intuitively corresponds to the activity tree of the subactivity that is being iterated).

Nondeterministic iteration, such as

Occurrences of painting consist of multiple occurrences of coating is axiomatized by a process description of the form:

$\forall$($o_1$) occurrence_of($o_1$, painting) $\supset$ ($\forall$($o_2$, $s_1$) occurrence_of($o_2$, coating) $\wedge$ subactivity_occurrence($o_2$, $o_1$) $\wedge$ leaf_occ($s_1$, $o_2$) $\supset$ (leaf_occ($s_1$, $o_1$) $\vee$ ($\exists$($o_3$, $s_2$) occurrence_of($o_3$, coating) $\wedge$ ($s_2$=root_occ($o_3$)) $\wedge$ next_subocc($s_1$, $s_2$, painting))))

DTO axiom #2 follows the conditional activities axiom:

For conditional activities, the fluents that hold prior to the activity occurrence determine which subactivities occur, as in the constraint Within the painting activity, if the surface of the product is rough, then sand the product which is written as:

$\forall$(s, $o_1$, x) occurrence_of($o_1$, paint(x)) $\wedge$ (root_occ($o_1$)=s) $\wedge$ prior(rough(x), s) $\supset$ ($\exists o_2$) occurrence_of($o_2$, sand(x)) $\wedge$ subactivity_occurrence($o_2$, $o_1$) $\wedge$ (root_occ($o_2$)=s)

Reasoner

The reasoner 520, in examining the logic of the transformation implementation 508, 516, combined with knowledge represented in the Business Ontology 518 and the Data Transformation Ontology 512 can infer if the implemented transformations align with the requirements (embedded within the Business Ontology 518). Table 9 shows in a table an example of a parsing of an example transformation logic into a summarization of actions:

TABLE 9

Example Reasoner Summarization of Actions

| Statement | | Outputs from Reasoner | Business Ontology | DTO |
|---|---|---|---|---|
| (3) | ... Client Table | client(x, y), person(x), organization(y) | Axiom #1 | |
| (3), (4)- (12) | FOR each ... | | | Axiom #1 |

TABLE 9-continued

Example Reasoner Summarization of Actions

| Statement | | Outputs from Reasoner | Business Ontology | DTO |
|---|---|---|---|---|
| (4) | SELECT ... | product(z), issues(y, z), purchase(x, z), owns(x, z) openProduct(z) due to Axiom #4 | Axiom #2, Axiom #3, Axiom #4 | |
| (4) | ... WHERE | | | Axiom #3 |
| (5) | If not NULL | | | Axiom #2 |
| (6), | FOR | | | Axiom #1 |
| (7)- (10) | each ... | | | |
| (7) | SELECT ... | bankActivity(z) activeProduct(z) due to Axiom #5 | | Axiom #5 |
| (7) | ... WHERE | | | Axiom #3 |
| (8) | If not NULL | active_client_indicator set to true given semantics represented by Axiom #3 of the DTO | Axiom #6 | Axiom #2 |

In this example, upon seeing statements (1) and (2), there is no information in the Business Ontology or the DTO which can be applied, and so the statements will be ignored (i.e., they are not semantically significant).

In this example, upon seeing statement (3), the Client Table 222 is used and hence the implemented transformation logic implements the concept of a client. Given the transformation logic (in this illustration) is within the context of an organization, the client is therefore a client in relation to an organization. In addition, it can be assumed that the client is a human being. In other words, the Reasoner 520 can infer that the presence of Client Table 222 in the statement implies that the primitives person(x), organization(y), client(x,y) are implemented.

In this example, also in statement (3), a FOR loop is implemented and statements (4) to (12) contain the implementation (i.e., what is being iterated) for the FOR loop. Axiom 1 of the Data Transformation Ontology (DTO) can then be applied to represent the semantics of the FOR loop.

In this example, in statement (4), a simple SELECT statement is detected. The simple SELECT statement constitutes a filter where Axiom #3 of the DTO can be applied. In step 522, once the Reasoner 520 examines the implementation code 508 or pseudo code 516, with the help of DTO 512, the Reasoner basically has the implementation code expressed in logic form (e.g. First Order Logic). Reasoning techniques such as deduction (e.g., Logical Equivalence) can be used to prove the logic representation (i.e., semantics) of the implementation code matches the semantics of the Business Ontology 518.

Figure 7:
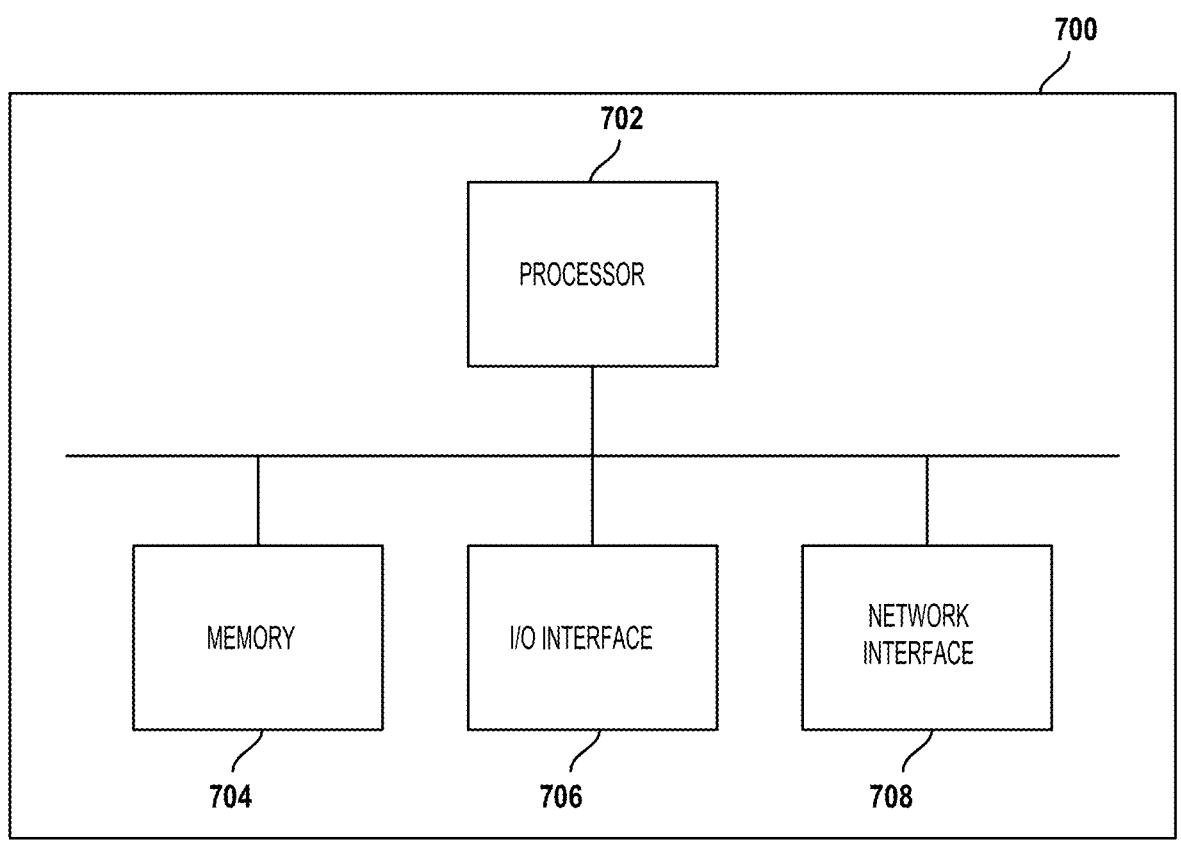
FIG. 7 is a schematic diagram of a computing device such as a server.

FIG. 7 is a schematic diagram of a computing device 700 such as a server. As depicted, the computing device includes at least one processor 702, memory 704, at least one I/O interface 706, and at least one network interface 708.

Processor 702 may be an Intel or AMD x86 or x64, PowerPC, ARM processor, or the like. Memory 704 may include a suitable combination of computer memory that is located either internally or externally such as, for example, random-access memory (RAM), read-only memory (ROM), compact disc read-only memory (CDROM).

Each I/O interface 706 enables computing device 700 to interconnect with one or more input devices, such as a keyboard, mouse, camera, touch screen and a microphone, or with one or more output devices such as a display screen and a speaker.

Each network interface 708 enables computing device 700 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WMAX), SS7 signaling network, fixed line, local area network, wide area network, and others.

The discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for verifying a data lineage of a data element, the system comprising:
    at least one processor; and a memory comprising instructions which, when executed by the at least one processor, configure the at least one processor to:
    construct a data transformation ontology;
    extract data transformation code from programming logic using abstract syntax trees;
    extract and describe data transformation semantics from the data transformation code using a data transformation ontology;
    use a reasoner unit to filter out non-business-significant transformations with an inference engine based on the data transformation ontology and pseudo code generated based on the data transformation ontology, wherein the inference engine uses at least the pseudo code to detect one or more entities; and
    determine that remaining business-significant transformations match a business ontology.

2. The system as claimed in claim 1, wherein the data element comprises a critical data element.

3. The system as claimed in claim 1, wherein the extracted data transformation semantics include business significant and non-business significant data transformation semantics.

4. The system as claimed in claim 1, wherein to extract data transformation code from programming logic, the at least one processor is configured to:
    parse and trace the data transformation code to extract the data lineage.

5. The system as claimed in claim 4, wherein the at least one processor is configured to:
    obtain a source data element;
    determine data transformation logic in an implementation language; and
    determine a target data element.

6. The system as claimed in claim 5, wherein to extract data transformation semantics from the data transformation code using a data transformation ontology, the at least one processor is configured to:
    abstract the data transformation logic into the pseudo code using action terms from the data transformation ontology.

7. The system as claimed in claim 1, wherein to determine that remaining business-significant transformations match a business ontology, the at least one processor is configured to:
    reason if a data transformation action has business-significance;
    remove the data transformation action if it has no business significance;
    compare remaining data transformations with a business ontology; and
    determine that the data lineage for the data element is correct if the resultant business significant transformations match semantics specified in the business ontology.

8. A computer-implemented method of verifying a data lineage of a data element, the method comprising:
- constructing a data transformation ontology;
- extracting data transformation code from programming logic using abstract syntax trees;
- extracting and describing data transformation semantics from the data transformation code using a data transformation ontology;
- using a reasoner unit for filtering out non-business-significant transformations with an inference engine based on the data transformation ontology and pseudo code generated based on the data transformation ontology, wherein the inference engine uses at least the pseudo code to detect one or more entities; and
- determining that remaining business-significant transformations match a business ontology.

9. The method as claimed in claim 8, wherein the data element comprises a critical data element.

10. The method as claimed in claim 8, wherein the extracted data transformation semantics include business significant and non-business significant data transformation semantics.

11. The method as claimed in claim 8, comprising:
- parsing and tracing the data transformation code to extract the data lineage.

12. The method as claimed in claim 11, comprising:
- obtaining a source data element;
- determining data transformation logic in an implementation language; and
- determining a target data element.

13. The method as claimed in claim 12, wherein extracting data transformation semantics from the data transformation code using a data transformation ontology comprises:
- abstracting the data transformation logic into the pseudo code using action terms from the data transformation ontology.

14. The method as claimed in claim 8, wherein determining that remaining business-significant transformations match a business ontology comprises:
- reasoning if a data transformation action has business-significance;
- removing the data transformation action if it has no business significance;
- comparing remaining data transformations with a business ontology; and
- determining that the data lineage for the data element is correct if the resultant business significant transformations match semantics specified in the business ontology.

15. A non-transitory computer-readable storage medium having instructions thereon which when executed by a processor perform a method of verifying a data lineage of a data element, the method comprising:
- constructing a data transformation ontology;
- extracting data transformation code from programming logic using abstract syntax trees;
- extracting and describing data transformation semantics from the data transformation code using a data transformation ontology;
- using a reasoner unit for filtering out non-business-significant transformations with an inference engine based on the data transformation ontology and pseudo code generated based on the data transformation ontology, wherein the inference engine uses at least the pseudo code to detect one or more entities; and
- determining that remaining business-significant transformations match a business ontology.

* * * * *